(12) United States Patent
Harada et al.

(10) Patent No.: US 8,450,595 B2
(45) Date of Patent: May 28, 2013

(54) NON-AQUEOUS ELECTROLYTE BATTERY AND METHOD FOR PRODUCING THE SAME

(75) Inventors: Tamotsu Harada, Fukushima (JP);
Yoshiaki Naruse, Fukushima (JP);
Takashi Ishigooka, Chiba (JP);
Nobuyuki Ohyagi, Fukushima (JP)

(73) Assignee: Sony Corporation (JP)

( * ) Notice: Subject to any disclaimer, the term of this patent is extended or adjusted under 35 U.S.C. 154(b) by 750 days.

(21) Appl. No.: 12/348,523

(22) Filed: Jan. 5, 2009

(65) Prior Publication Data
US 2009/0186270 A1 Jul. 23, 2009

(30) Foreign Application Priority Data
Jan. 23, 2008 (JP) ................. 2008-012589

(51) Int. Cl.
*H01M 2/02* (2006.01)
*H01M 2/24* (2006.01)
*H01M 4/02* (2006.01)

(52) U.S. Cl.
USPC .......... 136/243; 136/244; 136/245; 136/246; 136/247; 136/248; 136/249; 136/250; 136/251; 136/252; 136/253; 136/254; 136/255; 136/256; 136/257; 136/258; 136/259; 136/260; 136/261; 136/262; 136/263; 136/264; 136/265; 429/146; 429/163; 429/185

(58) Field of Classification Search
CPC ............. H01M 2/02; H01M 2/24; H01M 4/02
USPC ................. 429/146, 163, 185; 136/243–265
See application file for complete search history.

(56) References Cited

U.S. PATENT DOCUMENTS
2008/0213659 A1 * 9/2008 Yamada ................ 429/181

FOREIGN PATENT DOCUMENTS

| JP | 10-247480 | 9/1998 |
|---|---|---|
| JP | 2000-021368 | 1/2000 |
| JP | 2001-297795 | 10/2001 |
| JP | 2002-260609 | 9/2002 |
| JP | 2004-199994 | 7/2004 |
| JP | 2005-116474 | 4/2005 |
| JP | 2006-093131 | 4/2006 |
| JP | 2006-100064 | 4/2006 |
| JP | 2007-087922 | 4/2007 |
| JP | 2007-141640 | 5/2007 |

OTHER PUBLICATIONS

Japanese Office Action for corresponding JP2008-012589 dated Mar. 1, 2011.
Japanese Office Action (JP2008-012589) issued on Jan. 5, 2010.

* cited by examiner

*Primary Examiner* — Brian P Mruk
(74) *Attorney, Agent, or Firm* — Sheridan Ross P.C.

(57) ABSTRACT

A non-aqueous electrolyte battery includes a battery element, a film-form casing member, and a resin protective layer. The battery element includes a positive electrode, a negative electrode, and a separator disposed between the positive electrode and the negative electrode. The film-form casing member contains the battery element and an electrolyte in an enclosed space thereof. The resin protective layer is formed along the surface of the film-form casing member and has a substantially uniform thickness.

14 Claims, 12 Drawing Sheets

F I G. 11A
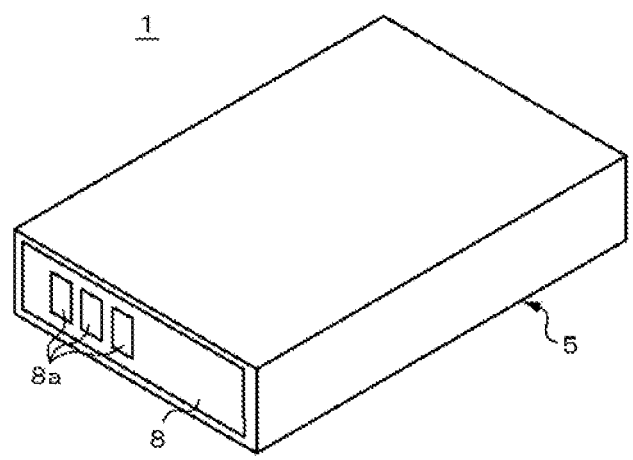
F I G. 11B
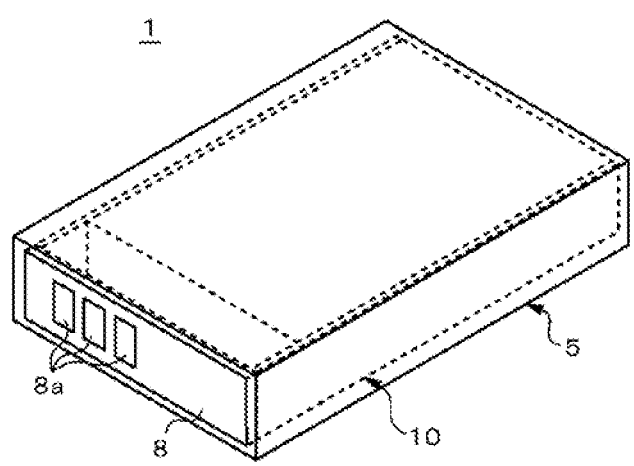

F I G . 13
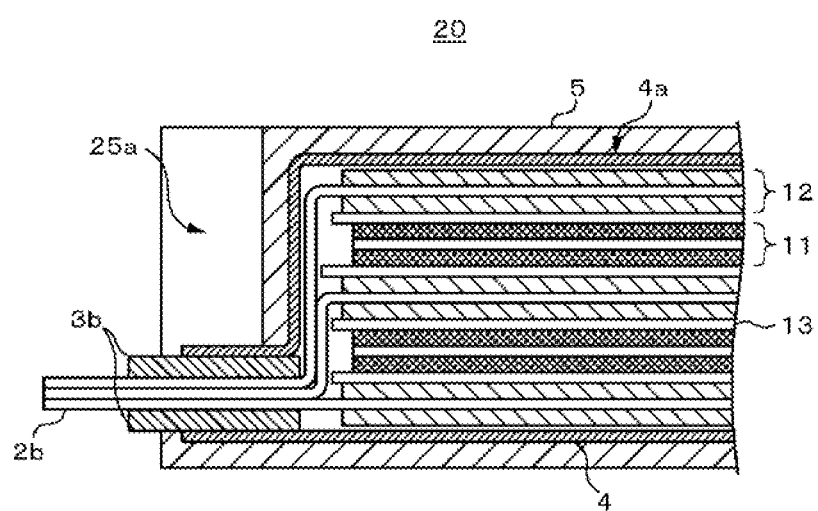

F I G . 15
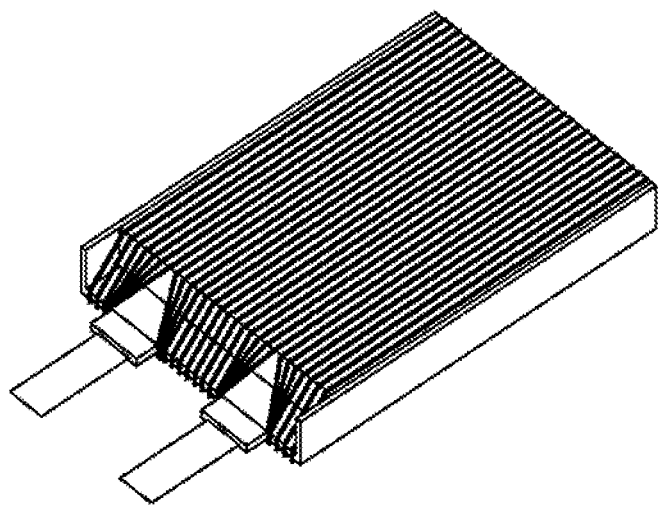

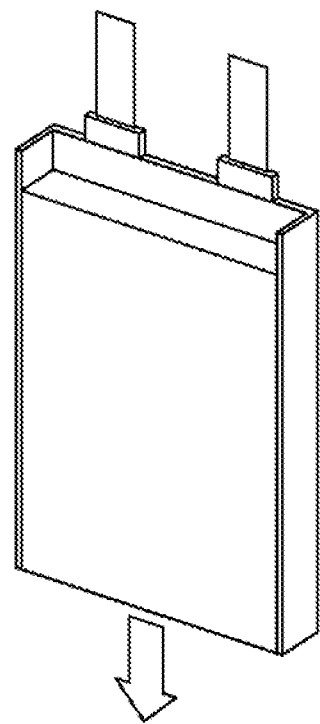
F I G. 16A
F I G. 16B

NON-AQUEOUS ELECTROLYTE BATTERY AND METHOD FOR PRODUCING THE SAME

CROSS-REFERENCE TO RELATED APPLICATIONS

The present application claims priority to Japanese patent Application No. 2008-12589 filed in the Japanese Patent Office on Jan. 23, 2008, the entire disclosures of which is incorporated herein by reference.

BACKGROUND

The present application relates to a non-aqueous electrolyte battery and a method for producing a non-aqueous electrolyte battery. More particularly, the present application relates to a non-aqueous electrolyte battery having high strength and providing a satisfactory safety and a method for producing a non-aqueous electrolyte battery.

In recent years, various types of portable electronic devices, such as camera-integrated video tape recorders (VTRs), cell phones, and laptop computers, come on the market, and those having smaller size and weight are being developed. As the portable electronic devices are reduced in size and weight, demand for battery as a power source of them is rapidly increasing, and, for reducing the size and weight of the device, a battery for the device is required to be designed so that the battery is lightweight and thin, and efficiently uses the space in the device. As a battery that can meet such demands, a lithium-ion secondary battery having a large energy density and a large power density is the most preferable.

In a common lithium-ion secondary battery, for achieving high productivity, a structure is used such that a separator is disposed between generally a strip-shaped positive electrode and a strip-shaped negative electrode and they are stacked on one another and spirally wound together into a cylindrical or substantially elliptic shape to form a battery element and the battery element is sealed in a casing member material, together with an electrolytic solution or electrolyte. Alternatively, there can be used a structure of device in which a plurality of basic stacked units are stacked on one another wherein each basic stacked unit includes a flat-shaped positive electrode, a separator, and a flat-shaped negative electrode. When such a stacked structure is used, positive and negative electrode leads can be easily led from each basic stacked unit, thereby making it possible to reduce the internal current collection resistance while maintaining a simple structure and high productivity.

As described above, the battery element having a spirally wound structure or a stacked structure can be a substantially rectangular shape. Accordingly, as a casing member material covering the battery element, there can be employed a metal laminated film having a basic structure including a polymer film, a metallic foil, and a polymer film which are staked on one another into a laminated structure. A casing member material composed of a metal laminated film can considerably reduce the battery weight, as compared to a casing member material made of a metal, and therefore possibly realizes a battery advantageously used in applications that require a high-power and light-weight battery, such as hybrid cars and electric cars. Further, the use of a casing member material made of a metal needs the cost of processing of the casing member material, such as drawing or welding, but the use of a metal laminated film can reduce the cost of processing, thereby making it possible to reduce the cost of production.

The battery using a casing member material composed of a metal laminated film is produced as follows. A metal laminated film is first subjected to deep drawing to form a space for containing a battery element therein, and a battery element is placed in the space. Then, the opening of the space containing therein the battery element is covered with the metal laminated film, and then the metal laminated film around the space is heat-sealed, so that the battery element is sealed in the laminated film. When sealing the battery element in the metal laminated film, lead portions of the individual positive and negative electrodes are extended to the outside of the casing member through the heat-sealed portion of the laminated film, thereby forming external electrode terminals.

The non-aqueous electrolyte battery using a metal laminated film as a casing member material can be reduced in weight and thickness, and further can reduce the cost of production; however, this battery has a problem of poor battery strength.

For solving the problem, the patent documents 1 to 3 below, discloses a non-aqueous electrolyte battery having improved strength such that the non-aqueous electrolyte battery described above is contained in a resin molded case formed by molding a plastic.

[Patent document 1] Japanese Patent No. 3556875
[Patent document 2] Japanese Patent No. 3614767
[Patent document 3] Japanese Patent No. 3643792

The resin molded case includes, for example, separate upper and lower cases, and the upper case and lower case are fitted to each other and connected together to form a housing having a space for containing the non-aqueous electrolyte battery therein and a circuit board connected to the non-aqueous electrolyte battery.

Further, the Japanese Unexamined Patent Application Publication No. 2003-168410 (Patent document 4) discloses a battery having a construction advantageous not only in that the battery strength is improved, but also in that, when gas is generated from the non-aqueous electrolyte battery due to decomposition of the electrolyte or the like, the gas can be discharged from the non-aqueous electrolyte battery.

The battery described in the patent document 4 includes a non-aqueous electrolyte battery covered with a metal laminated film, which is contained in a case having a protrusion inside of the case, and, when gas is generated in the non-aqueous electrolyte battery, the non-aqueous electrolyte battery expands and comes into contact with the protrusion formed inside of the case, so that the protrusion penetrates the metal laminated film. The protrusion formed inside of the case has therein a through hole communicating the tip of the protrusion with the outside of the case. By virtue of the through hole, when the protrusion sticks in the non-aqueous electrolyte battery, the gas generated in the non-aqueous electrolyte battery can be discharged to outside from the case.

As another method for securing the battery strength, the use of a spacer made of a resin inside the metal laminated film has been proposed as described in the Unexamined Japanese Patent Application Publication No. 2005-285557 (Patent document 5).

In the patent document 5, a spacer is formed along the form of the side portion of the battery element having a flat form, and both the battery element and the spacer are covered with a metal laminated film. By virtue of this structure, the battery element can be prevented from deforming even when an external pressure is applied to the battery element, thereby improving the battery strength.

The spacer may be in a form such that the four sides are continued and the battery element is contained in a pore portion formed in the center of the spacer.

SUMMARY

In the batteries described in the patent documents 1 to 4 in which the battery element is covered with a resin molded case, for protecting the battery element from an external impact and the like, the resin molded case needs a thickness of about 0.3 to 0.4 mm. For this reason, talking into consideration the thickness of an adhesive member for fixing the battery element to the resin molded case, the tolerance in molding the resin molded case, and the like, the resultant battery pack has a thickness larger than the thickness of the battery element by about 0.8 to 1.0 mm.

In the structure in which the battery element is covered with a pair of upper and lower resin molded cases, the upper case and lower case are joined together by, e.g., ultrasonic welding, using a fitting nail, using a screw, or bonding by welding using an organic solvent. For example, for improved joint of the upper case and lower case together by ultrasonic welding, a joint portion having a thickness of about 0.7 mm is needed. For this reason, the battery pack has a thickness larger than the thickness of the battery element by about 1.4 mm, and, when the battery element has a thickness of about 4.0 mm, the resultant battery pack inevitably has a volume about 1.3 to 1.4 time that of the battery element. When the upper case and lower case are fixed to each other using a fitting nail, a space for the nail must be formed in the upper case and lower case, causing the structures of the molds for the upper case and lower case to be complicated.

When the upper case and lower case are fixed to each other using a screw, a boss space is needed, and a step for turning a screw is required, which leads to a lowering of the production efficiency. When the cases are bonded together by welding using an organic solvent, the amount of the solvent applied varies to cause the bonding force to be non-uniform, which leads to a lowering of the productivity due to appearance failure.

In the structure described in the patent document 5 in which both the battery element and the spacer are contained in the casing member material composed of a metal laminated film, when the amount of the electrolyte layer applied varies to cause the size of the battery element to be larger than a predetermined size, a problem occurs in that a difference in form is caused between the battery element and the spacer. In such a case, the spacer is difficult to dispose or the battery element cannot be placed in a predetermined position for the spacer, thereby causing process defective products.

Accordingly, it is desirable to provide a non-aqueous electrolyte battery having high strength and providing satisfactory safety and a method for producing a non-aqueous electrolyte battery.

In accordance with a first embodiment, there is provided a non-aqueous electrolyte battery which comprises: a battery element including a positive electrode, a negative electrode, and a separator disposed between the positive electrode and the negative electrode; a film-form casing member for containing the battery element and an electrolyte in an enclosed space; and a resin protective layer being formed along the surface of the film-form casing member and having a uniform thickness.

In an embodiment, the resin protective layer contains a fiber material inside the layer from the viewpoint of improving the battery strength. With respect to the fiber material, continuous fiber is preferred, and, for example, a woven fabric formed by weaving the continuous fiber is further preferably used. With respect to the fiber material, a non-woven fabric formed from short fiber is also preferably used. In an embodiment, the fiber material is provided so that the fiber material is wound around, for example, the film-form casing member covering the battery element.

With respect to the fiber material, specifically, at least one member selected from glass fiber, carbon fiber, and aramid fiber is preferably used.

In an embodiment, the resin protective layer is composed of a photosetting resin or a thermosetting resin.

In an embodiment, the battery element has a stacked electrode structure including the positive electrode, negative electrode, and separator disposed therebetween, which are stacked on one another.

In accordance with another embodiment, there is provided a non-aqueous electrolyte battery which includes: a battery element including a positive electrode, a negative electrode, and a separator disposed between the positive electrode and the negative electrode, wherein the positive electrode, negative electrode, and separator are stacked on one another; a film-form casing member for containing the battery element and an electrolyte in an enclosed space; and a resin protective layer being formed along the surface of the film-form casing member and having a uniform thickness, wherein the resin protective layer has an opening through which a part of a sealing portion of the film-form casing member is exposed.

In an embodiment, the sealing portion of the film-form casing member exposed through the opening has a pressure resistance lower than the pressure resistance of another sealing portion from the viewpoint of improving the safety. For example, in an embodiment, the opening is formed in a portion facing at least one of a first lead portion through which a positive electrode terminal electrically connected to the positive electrode is electrically extended from the sealing portion of the film-form casing member and a second lead portion through which a negative electrode terminal electrically connected to the negative electrode is electrically extended from the sealing portion of the film-form casing member.

When the opening is formed in a portion facing the first lead portion and/or second lead portion, in an embodiment, the non-aqueous electrolyte battery further includes a first resin film, formed between the film-form casing member and the positive electrode terminal, having good adhesive properties with the positive electrode terminal and a second resin film, formed between the film-form casing member and the negative electrode terminal, having good adhesive properties with the negative electrode terminal, wherein the first resin film and second resin film are formed so that a first contact area between the positive electrode terminal and the first resin film and a second contact area between the negative electrode terminal and the second resin film are different from each other.

In another embodiment, the resin protective layer contains a fiber material inside the layer.

In accordance with a further embodiment, there is provided a method for producing a non-aqueous electrolyte battery, wherein the method includes the steps of: stacking a positive electrode, a negative electrode, and a separator on one another so that the separator is disposed between the positive electrode and the negative electrode to prepare a battery element; welding individually a plurality of positive electrode terminals electrically connected to the positive electrode and a plurality of negative electrode terminals electrically connected to the negative electrode; covering the battery element with a film-form casing member and sealing the casing member around the battery element; placing the battery element covered with the film-form casing member in a mold; filling a space between the battery element covered with the film-form casing member and the mold with a resin material; and curing the resin material.

In an embodiment, the resin material is a photosetting resin or a thermosetting resin.

With respect to the step for curing the resin material, when the resin material is a photosetting resin, the resin material is cured by irradiating the resin material with a predetermined ray of light. In this case, the mold is formed from a material capable of transmitting a ray of light, such as glass. When the resin material is a thermosetting resin, the resin material is cured by heating the resin material at a predetermined temperature.

In an embodiment, the resin material contains therein a fiber material from the viewpoint of improving the battery strength. The method may further includes, after the step for covering the battery element, winding a fiber material around the battery element covered with the film-form casing member. In this case, with respect to the fiber material, continuous fiber, a woven fabric formed by weaving continuous fiber, or a non-woven fabric formed from short fiber is preferably used. When continuous fiber is used, in an embodiment, the continuous fiber is wound uniformly in a predetermined fiber direction.

In an embodiment, a resin protective layer is formed along the surface of the film-form casing member containing the battery element therein, and therefore the battery strength can be improved.

In another embodiment, part of the film-form casing member is exposed, thereby making it possible to facilitate the lowering of the battery internal pressure when the internal pressure rises.

In a further embodiment, the resin protective layer can be formed without forming a useless space between the resin protective layer and the battery element covered with the film-form casing member.

Additional features and advantages are described herein, and will be apparent from the following Detailed Description and the figures.

BRIEF DESCRIPTION OF THE FIGURES

FIG. 11A and 11B are diagrammatic views showing another example of the construction of a non-aqueous electrolyte battery according to an embodiment.

FIG. 13 is a cross-sectional view showing another example of the construction of a non-aqueous electrolyte battery according to an embodiment.

FIG. 15 is a diagrammatic view showing how to wind a fiber material with respect to the sample 1-4.

FIG. 16A and 16B are diagrammatic views showing a method for the drop test and a method for evaluation.

DETAILED DESCRIPTION

The present application is described below in greater detail with reference to the figures according to an embodiment.

(1) First Embodiment

Hereinbelow, a first embodiment will be described with reference to the accompanying drawings. In the first embodiment, a non-aqueous electrolyte battery having a battery element covered with a metal laminated film as a casing member material and having a resin protective layer formed around the laminated film is described.

In the present specification, frequently, a lead side for the positive electrode terminal and negative electrode terminal in the non-aqueous electrolyte battery is referred to as "top portion", a side opposite to the top portion is referred to as "bottom portion", and a side portion disposed between the top portion and the bottom portion is referred to as "side portion". The non-aqueous electrolyte battery using a battery element having a stacked structure is described below, but the present application is not limited to this, and can be applied to any thin battery element having a spirally wound structure, a zigzag folded structure, or the like.

(1-1) Construction of Non-Aqueous Electrolyte Battery

Figure 1A:
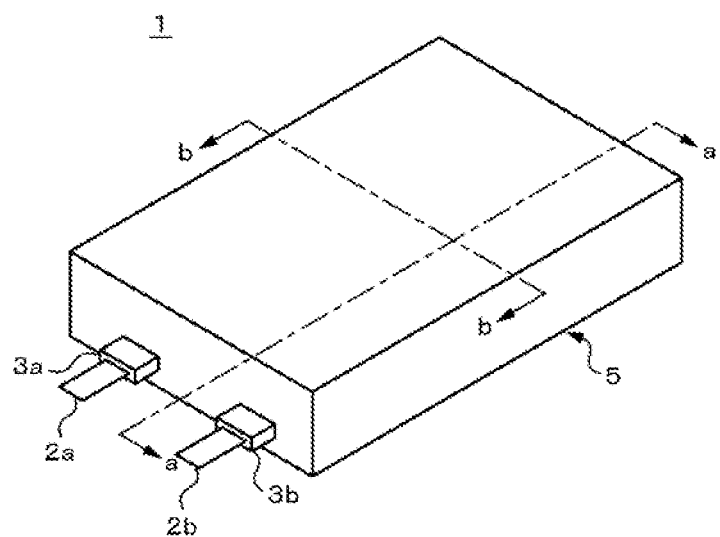
FIG. 1A and 1B are diagrammatic views showing an example of the construction of a non-aqueous electrolyte battery according to an embodiment.
Figure 1B:
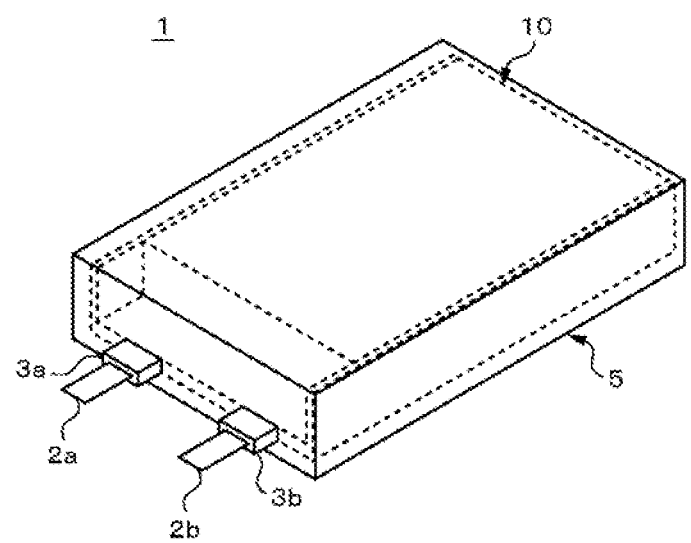
Figure 3:
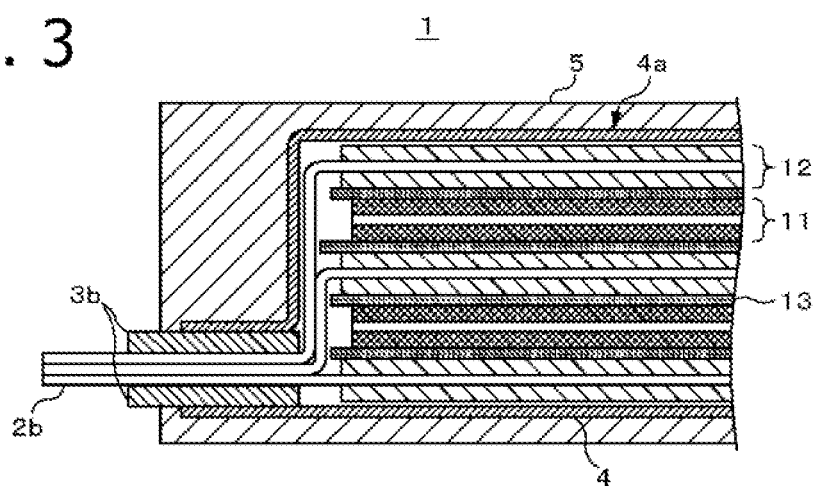
FIG. 3 is a cross-sectional view showing an example of the construction of a non-aqueous electrolyte battery according to an embodiment.
Figure 4:
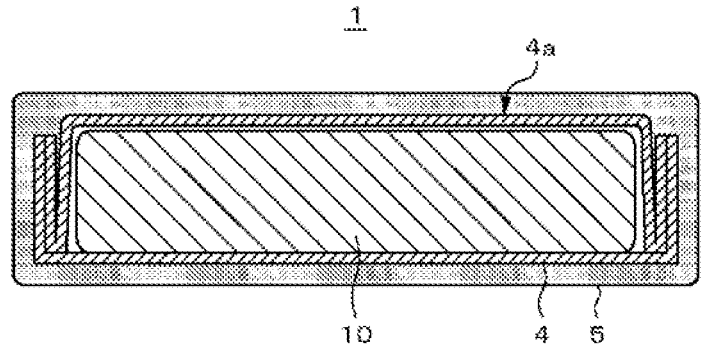
FIG. 4 is a cross-sectional view showing an example of the construction of a non-aqueous electrolyte battery according to an embodiment.

FIG. 1A is a diagrammatic view showing an example of the appearance of a lithium-ion secondary battery (hereinafter, frequently referred to as "secondary battery") 1 which is a non-aqueous electrolyte battery according to an embodiment, and FIG. 1B is a diagrammatic view showing an example of the construction of the secondary battery 1. As shown in a diagrammatic view of FIG. 2, a longitudinal cross-sectional view of FIG. 3, and a transverse cross-sectional view of FIG. 4, the secondary battery 1 has a battery element 10 covered with a laminated film 4 as a casing member material, and a resin protective layer 5 formed around the laminated film 4. From the battery element 10 are electrically extended a positive electrode terminal 2a electrically connected to a positive electrode 11 and a negative electrode terminal 2b electrically connected to a negative electrode 12 (hereinafter, frequently referred to as "electrode terminal 2" unless otherwise an electrode terminal is specified). FIG. 3 shows a cross-section taken along the line a-a in FIG. 1A, and FIG. 4 shows a cross-section taken along the line b-b in FIG. 1A. In each figure, an electrolyte is not shown.

Resin Protective Layer

The resin protective layer 5 is formed around the laminated film 4 containing the battery element therein, and, for example, a photosetting resin curable by irradiation with a ray of light or a thermosetting resin curable by heating is used. Examples of the photosetting resin include an ultraviolet curing resin curable by irradiation with ultraviolet light.

With respect to the ultraviolet curing resin, generally, there is used a resin material obtained by subjecting a prepolymer component and a monomer component to curing reaction using a photopolymerization initiator, such as benzophenone or benzoin ether. Examples of prepolymer components include polyurethane, polyester acrylate, polyurethane acrylate, epoxy acrylate, and polyether acrylate. Examples of monomer components include dicyclopentanyl diacrylate, ethylene oxide (EO)-modified bisphenol A acrylate, trimethylpropane triacrylate, EO-modified trimethylolpropane triacrylate, and dipentaerythritol hexaacrylate.

With respect to the thermosetting resin, there is selected a resin material curable at a temperature which does not damage the positive electrode 11 and negative electrode 12 or the separator 13. Particularly, the separator 13 composed of a certain material is melted and clogs the pores when the temperature in the battery rises to about 120° C., inhibiting a cell reaction between the positive electrode 11 and the negative electrode 12. When the temperature in the battery is further increased, the separator 13 suffers heat shrinkage, so that short-circuiting occurs between the positive electrode 11 and the negative electrode 12.

Consequently, a resin material curable at 100° C. or lower, preferably at 80° C. or lower, more preferably at 60° C. or lower is used. Examples of such resin materials include polyurethane, a natural rubber, a synthetic rubber, an epoxy resin, a phenolic resin, polyester, polyamide, silicone, a cyanate resin and/or a prepolymer formed therefrom as a raw material, a bismaleimide-triazine resin, a melamine resin, thermosetting polyimide, and mixtures of one or more of the thermosetting resins.

The thermosetting resin includes a cold-setting resin which does not need heating for curing.

The ultraviolet curing resin or thermosetting resin may be used together with a thermoplastic resin, such as a phenoxy resin, a polyamideimide resin, a polyphenylene oxide resin, or a polyether sulfone resin. If necessary, an additive, such as inorganic filler, a silane coupling agent, a coloring agent, a binder resin, a leveling agent, an ion capturer, or a releasing agent, may be added to the resin.

The ultraviolet curing resin or thermosetting resin may be used in the form of a fiber material impregnated with the ultraviolet curing resin or thermosetting resin. With respect to the fiber material, for example, carbon fiber, graphite fiber, aramid fiber, silicon carbide fiber, alumina fiber, boron fiber, tungsten carbide fiber, glass fiber, or the like is preferably used. These fiber materials may be used in combination.

A fiber material impregnated with a resin is generally called fiber reinforced plastic, and has good mechanical properties (high specific strength, high specific rigidity, and fatigue resistance), good physical properties (damping properties and low thermal expansion), and good environmental resistance (water resistance, chemical resistance, and weathering resistance). By using such a resin as a material for the resin protective layer, the casing member material composed of a sheet material, such as an aluminum laminated film, can be improved in strength and sealing properties, thereby obtaining a battery casing member material having high strength especially at a corner portion.

With respect to the form of the fiber material, various types of fiber, such as short fiber or continuous fiber, can be used. Particularly, from the viewpoint of obtaining a resin having higher physical properties including rigidity and strength, continuous fiber is preferably used. From the viewpoint of more surely preventing deformation of the secondary battery, a fiber material having low extensibility is preferably used.

Figure 5:
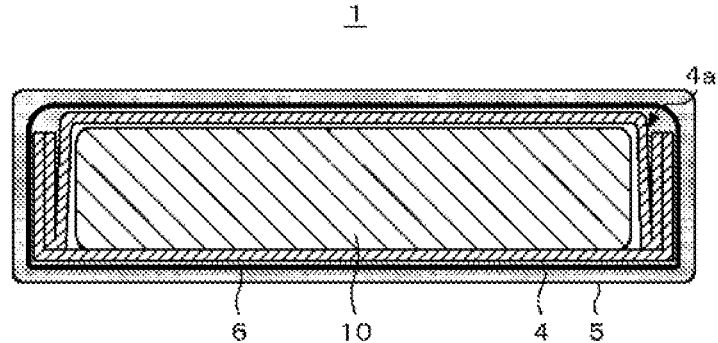
FIG. 5 is a cross-sectional view showing another example of the construction of a non-aqueous electrolyte battery according to an embodiment.

Continuous fiber means a fiber material which is formed from continuous fiber and which does not have a predetermined range of length. When continuous fiber is used as the fiber material, from the viewpoint of simplifying the process for producing a battery, in an embodiment, a woven fabric formed by weaving the continuous fiber is used. When a woven fabric or non-woven fabric is used, by a method in which, for example, a woven fabric or non-woven fabric impregnated with an ultraviolet curing resin or a thermosetting resin is wound around the battery element 10, or a woven fabric or non-woven fabric is first wound around the battery element and then an ultraviolet curing resin or a thermosetting resin is applied to the fabric, a resin protective layer 5 containing therein a fiber material 6, such as a woven fabric or a non-woven fabric, is formed around the laminated film 4 covering the battery element 10 as shown in FIG. 5. FIG. 5 is a transverse cross-sectional view of the secondary battery 10 using a woven fabric or non-woven fabric.

Figure 6A:
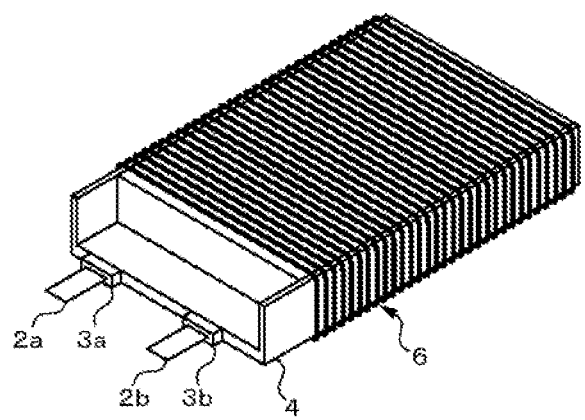
FIG. 6A and 6B are diagrammatic views showing another example of the construction of a non-aqueous electrolyte battery according to an embodiment.
Figure 6B:
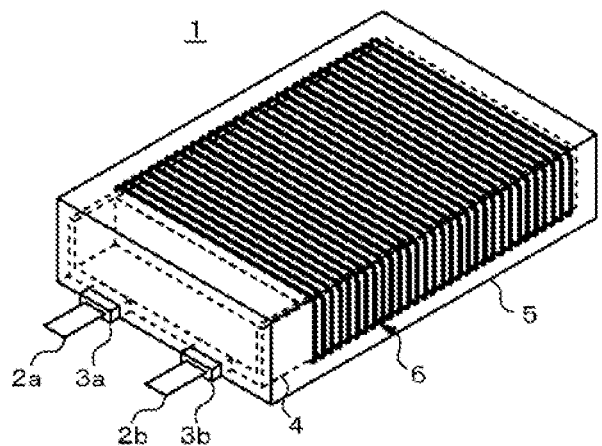

When continuous fiber is used as the fiber material, by a method in which, for example, continuous fiber impregnated with an ultraviolet curing resin or a thermosetting resin is wound around the battery element 10 covered with the laminated film 4, or, as shown in FIG. 6A, continuous fiber is first wound around the battery element 10 covered with the laminated film 4 and then an ultraviolet curing resin or a thermosetting resin is applied to the fiber, a resin protective layer 5 containing therein a fiber material 6 shown in FIG. 6B can be formed. Alternatively, using a non-woven fabric formed from short fiber, the resin protective layer 5 can be formed by the above-mentioned method of winding fiber.

When winding the continuous fiber, the continuous fiber is wound, for example, in a predetermined direction uniformly. The secondary battery is improved in strength against the force especially in the direction parallel to the direction of winding the continuous fiber, and hence unlikely to suffer deformation. Therefore, the secondary battery can be improved in strength against force in a plurality of directions by, for example, winding the continuous fiber in both the side portion direction and the top portion-bottom portion direction.

Figure 7:
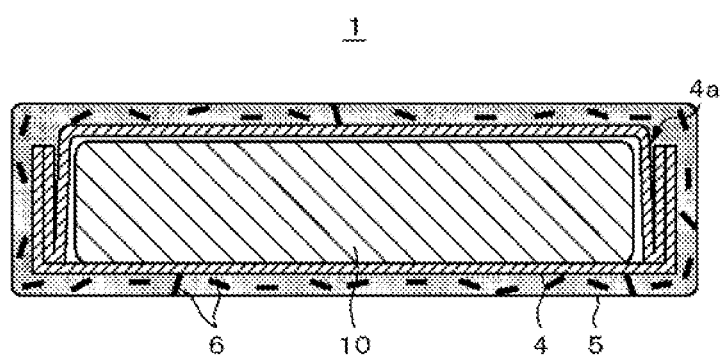
FIG. 7 is a cross-sectional view showing another example of the construction of a non-aqueous electrolyte battery according to an embodiment.

Short fiber means any fiber materials cut short. When short fiber is used as the fiber material, short fiber is mixed into an ultraviolet curing resin or a thermosetting resin, and the ultraviolet curing resin or thermosetting resin containing the short fiber is molded into a predetermined shape around the battery element 10 to form a resin protective layer 5 containing therein a fiber material 6 shown in FIG. 7. FIG. 7 is a transverse cross-sectional view of the secondary battery 10 using short fiber. A non-woven fabric using a fiber material cut short can be used, The fiber direction of the short fiber is substantially the same as the direction of flow of the ultraviolet curing resin or thermosetting resin. Accordingly, by appropriately selecting the direction of flow of the ultraviolet curing resin or thermosetting resin upon forming the resin protective layer 5 so that a desired fiber direction is obtained, the battery strength can be improved.

Battery Element

Figure 2:
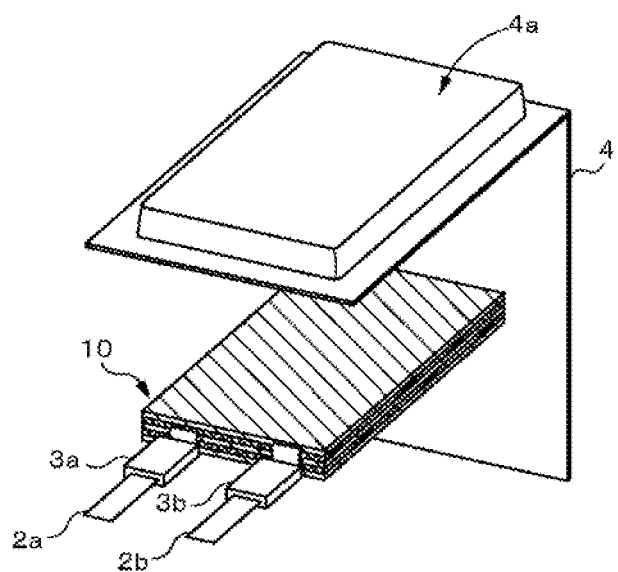
FIG. 2 is a diagrammatic view showing an example of the construction of a non-aqueous electrolyte battery according to an embodiment.

The battery element 10 has a stacked electrode structure obtained by, for example, as shown in FIG. 2, stacking on one another a substantially rectangular positive electrode 11, a substantially rectangular negative electrode 12 opposite to the positive electrode 11, and a separator 13 disposed between the positive and negative electrodes, and, for example, a not shown gel electrolyte layer may be formed on both sides of each of the positive electrode 11 and the negative electrode 12.

The battery element 10 is covered with a laminated film 4 as a casing member material. In a first region of the laminated film 4 is preliminarily formed a container portion 4a by, for example, drawing. The battery element 10 is contained in the container portion 4a. A second region of the laminated film 4 connected with the first region is folded so that the laminated film covers the opening of the container portion 4a, and sealed by bonding the edges of the opening of the container portion 4a by heat sealing or the like. In this instance, a plurality of positive electrode terminals 2a and negative electrode terminals 2b electrically extended from the positive electrode 11 and the negative electrode 12 are individually gathered together, and then extended to the outside through the sealing portion of the laminated film 4. The positive electrode terminal 2a and negative electrode terminal 2b are covered with bonding films 3a and 3b, respectively, in their regions in contact with the laminated film 4 to improve the bonding properties of the positive electrode terminal 2a and negative electrode terminal 2b with the laminated film 4.

Positive Electrode

Figure 8A:
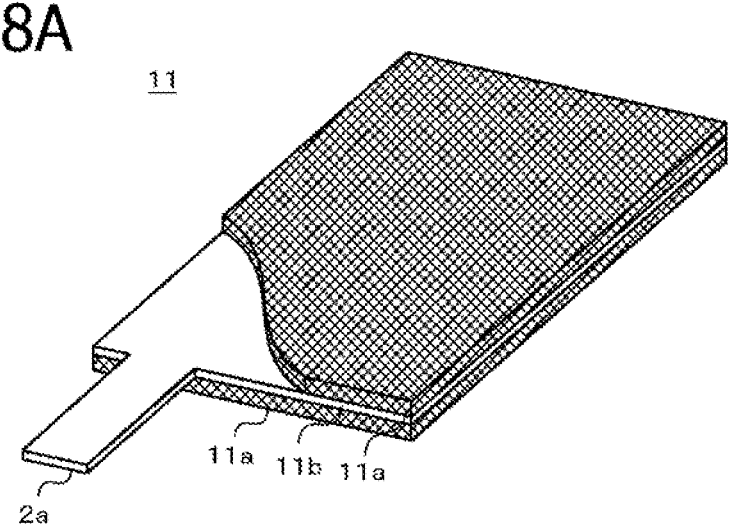
FIG. 8A and 8B are diagrammatic views showing an example of the construction of an electrode used in a non-aqueous electrolyte battery according to an embodiment.

FIG. 8A shows the construction of the positive electrode 11. The positive electrode 11 includes a substantially rectangular positive electrode current collector 11b, and a cathode active material layer 11a formed on both sides of the positive electrode current collector 11b. The positive electrode current collector 11b is a metallic foil composed of, e.g., aluminum (Al). A positive electrode terminal 2a integral with the positive electrode current collector 11B is electrically extended from one side of the positive electrode 11. Alternatively, a positive electrode terminal 2a in the form of a separate part may be connected and fixed to the positive electrode current collector 11b by ultrasonic welding or the like.

The positive electrode 11 shown in FIG. 8A is a diagrammatic view showing the construction of the positive electrode current collector 11b and the positive electrode terminal 2a unified with the positive electrode current collector 11b, and the cathode active material layer 11a is actually formed on the whole surface of the substantially rectangular positive electrode current collector 11b.

The cathode active material layer 11a includes, for example, a cathode active material, a conductor, and a binder. With respect to the cathode active material, a composite oxide of lithium and a transition metal, which is composed mainly of $Li_xMO_2$ (wherein M represents at least one transition metal, and x varies depending on the charged or discharged state of the battery, and is generally 0.05 to 1.10), is used. With respect to the transition metal constituting the lithium composite oxide, cobalt (Co), nickel (Ni), manganese (Mn), or the like is used.

Specific examples of the lithium composite oxides include lithium cobaltate ($LiCoO_2$), lithium nickelate ($LiNiO_2$), and lithium manganate ($LiMn_2O_4$). A solid solution obtained by replacing part of the transition metal element in the lithium composite oxide by another element can be used. Examples of the solid solutions include nickel-cobalt composite lithium oxides (e.g., $LiNi_{0.5}Co_{0.5}O_2$ and $LiNi_{0.8}Co_{0.2}O_2$). These lithium composite oxides can generate high voltage and have a good energy density.

With respect to the cathode active material, a lithium phosphate compound of lithium and a transition metal, which is composed mainly of $LiM_yPO_4$ (wherein M represents at least one transition metal, and y varies depending on the charged or discharged state of the battery, and is generally 0 to 1), can also be used. With respect to the transition metal constituting the lithium phosphate compound, iron (Fe), cobalt (Co), nickel (Ni), manganese (Mn), or the like is used.

Specific examples of the lithium phosphate compounds include iron lithium phosphate ($LiFePO_4$) and compounds obtained by replacing part of the iron in iron lithium phosphate by another element, such as cobalt (Co), nickel (Ni), or manganese (Mn), for improving the structure stability.

The lithium composite oxides and lithium phosphate compounds can generate high voltage and serve as a cathode active material having a good energy density.

Alternatively, with respect to the cathode active material, a metal sulfide or metal oxide containing no lithium, such as $TiS_2$, $MoS_2$, $NbSe_2$, or $V_2O_5$, may be used. In the cathode active material, these materials may be used in combination.

With respect to the conductor, a carbon material, such as carbon black or graphite, is used. With respect to the binder, for example, polyvinylidene fluoride (PVdF) or polytetrafluoroethylene (PTFE) is used.

Negative Electrode

Figure 8B:
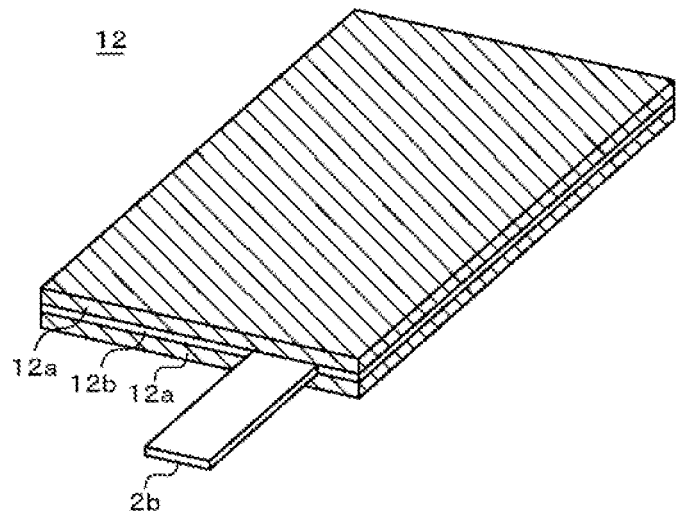

FIG. 8B shows the construction of the negative electrode 12. The negative electrode 12 includes a negative electrode current collector 12b having an outside dimension larger by several mm than that of the negative electrode current collector 11b, and an anode active material layer 12a formed on both sides of the negative electrode current collector 12b. The negative electrode current collector 12b is a metallic foil composed of, e.g., copper (Cu), nickel (Ni), or stainless steel (SUS). As in the case of the positive electrode 11, a negative electrode terminal 2b molded with the negative electrode current collector 12B is electrically extended from one side of the negative electrode 12.

The negative electrode current collector 12b is required to have a good electrochemical stability and a good electric conductivity as well as a good mechanical strength. The negative electrode 12 is exposed to a highly reductive atmosphere, and metals in the negative electrode including aluminum (Al) are likely to form an alloy, together with lithium (Li), resulting in a powdery material. Accordingly, a metal material unlikely to be alloyed with lithium may be required in the negative electrode current collector. Examples of such metal materials include copper (Cu), nickel (Ni), and stainless steel (SUS). Especially preferred is copper (Cu) having high electric conductivity and a good flexibility.

The anode active material layer 12a includes, for example, an anode active material, a conductor, and a binder. With respect to the anode active material, lithium metal, a lithium alloy, a carbon material capable of being doped and dedoped with lithium, or a composite material of a metal material and a carbon material is used. Specific examples of carbon materials capable of being doped and dedoped with lithium include hardly graphitizable carbon, easily graphitizable carbon, graphite, pyrolytic carbon, coke, glassy carbon, a calcined product of an organic polymer compound, carbon fiber, and activated carbon. Example of coke include pitch coke, needle coke, and petroleum coke. The calcined product of an organic polymer compound means a product obtained by carbonizing a polymer material, such as a phenolic resin or a furan resin, by calcination at an appropriate temperature, and part of this calcined product is classified into hardly graphitizable carbon or easily graphitizable carbon. Examples of polymer materials include polyacetylene and polypyrrole.

With respect to the anode material capable of having occluded therein and releasing lithium (Li), preferred is an anode material having a charge or discharge voltage relatively close to that of lithium metal. When the negative electrode 12 has a lower charge or discharge voltage, the battery can be easily increased in energy density. Especially preferred is a carbon material since the carbon material suffers very slight change of the crystalline structure during a charging or discharging operation and achieves both high charge or discharge capacity and good cycle characteristics. Particularly, graphite is preferred since the graphite has large electrochemical equivalent and achieves a high energy density. Hardly graphitizable carbon is preferred since it achieves good cycle characteristics.

With respect to the anode material capable of having occluded therein and releasing lithium (Li), examples include lithium metal, a metal element or semi-metal element capable of forming an alloy together with lithium (Li), and an alloy or compound thereof. The material is preferably used since a high energy density can be obtained. Especially, the material and a carbon material are more preferably used in combination since not only high energy density but also good cycle characteristics can be obtained. In the present specification, the alloy encompasses an alloy including two metal elements or more and an alloy including at least one metal element and at least one semi-metal element. In the configuration of alloy, a solid solution, an eutectic crystal (eutectic mixture), an intermetallic compound, or a combination thereof may be present.

Examples of the metal elements or semi-metal elements include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), and hafnium (Hf). Examples of alloys or compounds of the above metal or semi-metal elements include those represented by the chemical formula: $Ma_fMb_gLi_h$ or the chemical formula: $Ma_sMc_tMd_u$. In the chemical formulae, Ma represents at least one member of a metal element and a semi-metal element capable of forming an alloy together with lithium, Mb represents at least one member of a metal element and a semi-metal element other than lithium and Ma, Mc represents at least one nonmetal element, Md represents at least one member of a metal element and a semi-metal element other than Ma, and f, g, h, s, t, and u satisfy: $f>0$, $g\geq0$, $h\geq0$, $s>0$, $t>0$, and $u\geq0$.

Of these, preferred is a metal element or semi-metal element belonging to Group 4B in the short-form periodic table, or an alloy or compound thereof, and especially preferred is silicon (Si), tin (Sn), or an alloy or compound thereof. These may be either crystalline or amorphous.

Examples of the anode materials capable of having occluded therein and releasing lithium further include other metal compounds, such as oxides, sulfides, and lithium nitride ($LiN_3$). Examples of oxides include $MnO_2$, $V_2O_5$, and $V_6O_{13}$. In addition, examples of oxides having a relatively base potential and being capable of having occluded therein and releasing lithium include iron oxide, ruthenium oxide, molybdenum oxide, tungsten oxide, titanium oxide, and tin oxide. Examples of sulfides include NiS and MoS.

Particularly, graphite, such as natural graphite or artificial graphite, is widely used in lithium-ion battery since the graphite has a good chemical stability and undergoes a dedoping reaction for lithium ion repeatedly and stably, and further the graphite is easily commercially available.

With respect to the materials other than carbon, various types of metals or semi-metals may be used, and examples include metals or semi-metals capable of forming an alloy together with lithium, such as magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt), and alloys thereof. These may be either crystalline or amorphous.

With respect to the material capable of being doped and dedoped with lithium, a polymer, such as polyacetylene or polypyrrole, or an oxide, such as $SnO_2$, may be used.

Examples of binders include fluorine polymer compounds, such as polyvinylidene fluoride (PVdF), and synthetic rubbers, such as a styrene-butadiene rubber (SBR) and an ethylene-propylene-diene rubber (EPDR). Preferred is a polymer including repeating units derived from vinylidene fluoride (VdF). Such a polymer has a high stability in a secondary battery. Examples of the polymers include vinylidene fluoride-hexafluoropropylene (HFP) copolymers and vinylidene fluoride-tetrafluoroethylene (TFE) copolymers. These binders may be used individually or in combination.

Adhesive Film

The adhesive films 3a and 3b respectively formed on the positive electrode terminal 2a and negative electrode terminal 2b are individually composed of a resin material having good adhesive properties with a metal material constituting the positive electrode terminal 2a and the negative electrode terminal 2b. Examples of such resin materials include modified polymers, such as acid-modified polypropylene (PP).

Separator

The separator 13 is composed of, for example, a porous film made of a polyolefin resin material, such as polypropylene (PP) or polyethylene (PE), or a porous film made of an inorganic material, such as ceramic non-woven fabric, and a separator composed of two or more porous films stacked into a laminated structure may be used. Of these, a porous film made of polyethylene (PE) or polypropylene (PP) may be most effective.

Electrolyte

In the electrolyte, an electrolyte salt and a non-aqueous solvent generally used in lithium-ion secondary battery may be used. Specific examples of non-aqueous solvents include ethylene carbonate (EC), propylene carbonate (PC), γ-butyrolactone, dimethyl carbonate (DMC), diethyl carbonate (DEC), ethylmethyl carbonate (EMC), dipropyl carbonate (DPC), ethylpropyl carbonate (EPC), and solvents obtained by replacing the hydrogen in the above carbonates by a halogen. These solvents may be used individually or in combination.

With respect to the electrolyte salt, an electrolyte salt soluble in the non-aqueous solvent is used, and the salt includes a combination of cation and anion. With respect to the cation, an alkali metal or an alkaline earth metal is used. With respect to the anion, $Cl^-$, $Br^-$, $I^-$, $SCN^-$, $ClO_4^-$, $BF_4^-$, $PF_6^-$, $CF_3SO_3^-$, or the like is used. Specific examples include lithium hexafluorophosphate ($LiPF_6$), lithium tetrafluroborate ($LiBF_4$), lithium bis(trifluoromethanesulfonyl)imide ($LiN(CF_3SO_2)_2$), lithium bis(pentafluoroethanesulfonyl)imide ($LiN(C_2F_5SO_2)_2$), and lithium perchlorate ($LiClO_4$). With respect to the electrolyte salt concentration, there is no particular limitation as long as the electrolyte salt can be dissolved in the solvent, but the lithium ion concentration in the non-aqueous solvent is preferably in the range of from 0.4 to 2.0 mol/kg.

When using a polymer electrolyte, an electrolytic solution in a gel form obtained by mixing together the non-aqueous solvent and electrolyte salt is incorporated into a matrix polymer to obtain a polymer electrolyte. The matrix polymer is compatible with the non-aqueous solvent. With respect to the matrix polymer, a silicone gel, an acryl gel, an acrylonitrile gel, a polyphosphazene modified polymer, polyethylene oxide, polypropylene oxide, or a composite polymer, crosslinked polymer, or modified polymer thereof is used.

Examples of fluorine polymers include polymers, such as polyvinylidene fluoride (PVdF), copolymers including vinylidene fluoride (VdF) and hexafluoropropylene (HFP) in the repeating units, and copolymers including vinylidene fluoride (VdF) and trifluoroethylene (TFE) in the repeating units. These polymers may be used individually or in combination.

Laminated Film

Figure 9:
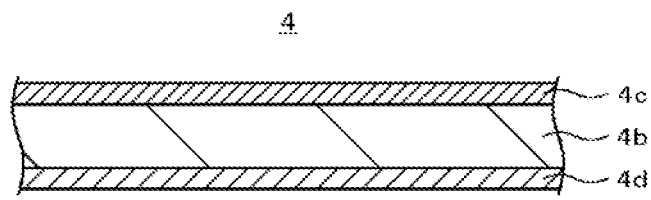
FIG. 9 is a cross-sectional view showing an example of the construction of a laminated film used in a non-aqueous electrolyte battery according to an embodiment.

The laminated film 4 used as a casing member material is composed of a multilayer film which has a moisture resistance and insulation properties, and which includes, as shown in FIG. 9, an outer resin layer 4c and an inner resin layer 4d formed on respective sides of a metallic foil 4b. In the outer resin layer 4c, for achieving good appearance, toughness, flexibility, and the like, nylon (Ny) or polyethylene terephthalate (PET) is used. The metallic foil 4b has an important role in preventing moisture, oxygen, or light from going into the casing member material to protect the battery element as contents, and, from the viewpoint of reduced weight, good stretchability, low cost, and good processability, aluminum (Al) is most often used. The inner resin layer 4d is a portion to be melted due to heat or ultrasonic waves and heat-sealed, and hence a polyolefin resin material, e.g., casted polypropylene (CPP) is frequently used.

Generally, the usable separator preferably has a thickness of 5 to 50 μm, more preferably 5 to 20 μm. When the thickness of separator is too large, the ratio of the active material to the separator is reduced to lower the battery capacity, and further the ion conduction properties become poor, so that the current properties become poor. On the other hand, when thickness of the separator is too small, the film of separator is reduced in mechanical strength, so that foreign matter or the like easily causes short-circuiting between the positive and negative electrodes or breaks the separator.

(1-2) Method for Producing a Non-Aqueous Electrolyte Battery

The secondary battery is produced by, for example, the method described below. For example, a cathode active material, low crystalline carbon, a conductor, and a binder are first mixed with each other to prepare a cathode mixture, and the cathode mixture prepared is dispersed in a solvent, such as N-methylpyrrolidone, to form a cathode mixture slurry. Subsequently, the resultant cathode mixture slurry is applied to a positive electrode collector 11b and dried to remove the solvent, and then subjected to compression molding by means of a roll pressing machine or the like to form a cathode active material layer 11a, thereby preparing a positive electrode 11.

Separately, for example, an anode active material and a binder are mixed with each other to prepare an anode mixture, and the anode mixture prepared is dispersed in a solvent, such as N-methylpyrrolidone, to form an anode mixture slurry. Subsequently, the resultant anode mixture slurry is applied to a negative electrode collector 12b and dried to remove the solvent, and then subjected to compression molding by means of a roll pressing machine or the like to form an anode active material layer 12a, thereby preparing a negative electrode 12.

Then, the positive electrode 11, negative electrode 12, and separator 13 disposed between the positive and negative electrodes are stacked on one another, and the predetermined number of positive electrodes 11 and negative electrodes 12 are stacked and then, the positive electrode 11, the negative electrode 12, and the separator 13 are fixed in a state such that, for example, they are pressed together. In fixing them, a bonding tape or the like is used. When using a gel electrolyte, a gel electrolyte layer is formed on both sides of each of the positive electrode 11 and the negative electrode 12, and then the separator 13 is disposed between the positive and negative electrodes and they are stacked on one another.

Subsequently, a plurality of positive electrode terminals 2a electrically extended from the stacked positive electrode 11 are gathered together, and welded by ultrasonic welding, resistance welding, or the like. A plurality of negative electrode terminals 2b electrically extended from the stacked negative electrode 12 are gathered together and welded in the same manner as in the positive electrode terminals 2a. Then, adhesive films 3a and 3b are formed on the positive electrode terminal 2a and the negative electrode terminal 2b, respectively, in their regions which are individually in contact with the laminated film 4 when the battery element is covered with the laminated film 4 in the subsequent step, thereby preparing a battery element 10 having a stacked electrode structure.

Then, the battery element 10 is placed in a container portion 4a of the laminated film 4 formed by deep drawing, and the laminated film 4 is folded so that the laminated film covers the opening of the container portion 4a, and sealed by bonding the edge portions of the container portion 4a by heat sealing or the like. When an electrolytic solution is used, two sides of the edge portions of the container portion 4a are sealed by heat sealing or the like, and an electrolytic solution is charged through one unsealed side and then this side is sealed up by heat sealing. The laminated film 4 may be either in the form folded as shown in FIG. 2 or in the form of two laminated films which have the battery element 10 disposed between them and of which edges around the battery element 10 are sealed by heat sealing.

Figure 10:
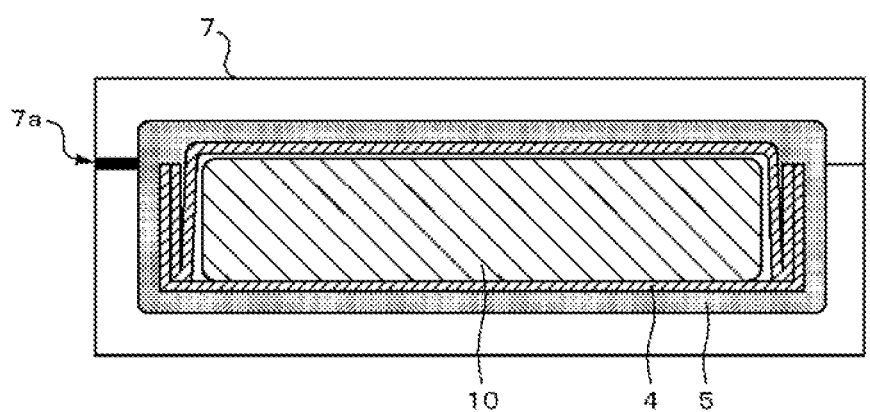
FIG. 10 is a diagrammatic view showing a method for producing a non-aqueous electrolyte battery according to an embodiment.

Subsequently, as shown in FIG. 10, the battery element 10 covered with the laminated film 4 is placed in a mold 7, and a space around the battery element 10 in the mold is filled with an ultraviolet curing resin or a thermosetting resin. Filling the mold with a resin material is made by injecting the resin material from, for example, a gate 7a of the mold 7. In this case, the ultraviolet curing resin or thermosetting resin may contain therein short fiber if desired. Alternatively, the battery element 10 is covered with the laminated film 4, and then continuous fiber, woven fabric, or non-woven fabric is wound around the battery element 10 and the battery element 10 is placed in the mold.

When an ultraviolet curing resin is used, a mold composed of a material capable of transmitting ultraviolet light, such as glass, is used. On the other hand, when a thermosetting resin is used, a material having a good thermal conductivity, such as a metal material generally used, is used in the mold.

When an ultraviolet curing resin is used, the ultraviolet curing resin is then cured by irradiating the resin with ultraviolet light through the outer surface of the mold. On the other hand, when a thermosetting resin is used, the thermosetting resin is cured by increasing the temperature of the mold if necessary. Finally, the mold is removed to obtain a secondary battery 10 having a resin protective layer 5 formed as the outermost surface.

In this case, as shown in FIG. 11A, a circuit board 8 connected to the positive electrode terminal 2a and the negative electrode terminal 2b of the battery element 10 covered with the laminated film 4 can be covered with the resin protective layer 5,1 together with the battery element 10. In this case, the resin protective layer 5 is formed so that contact points 8a formed in the circuit board 8 for connection with another electronic device are exposed.

(2) Second Embodiment

Hereinbelow, a second embodiment will be described with reference to the accompanying drawings. Generally, when a battery is, for example, in an overcharged state, the battery temperature is increased to cause decomposition of the electrolytic solution and the like, thus generating gas in the battery, so that the pressure in the battery rises. In the second embodiment, a secondary battery having improved safety when the pressure in the battery rises is described.

(2-1) Construction of Non-Aqueous Electrolyte Battery

Figure 12A:
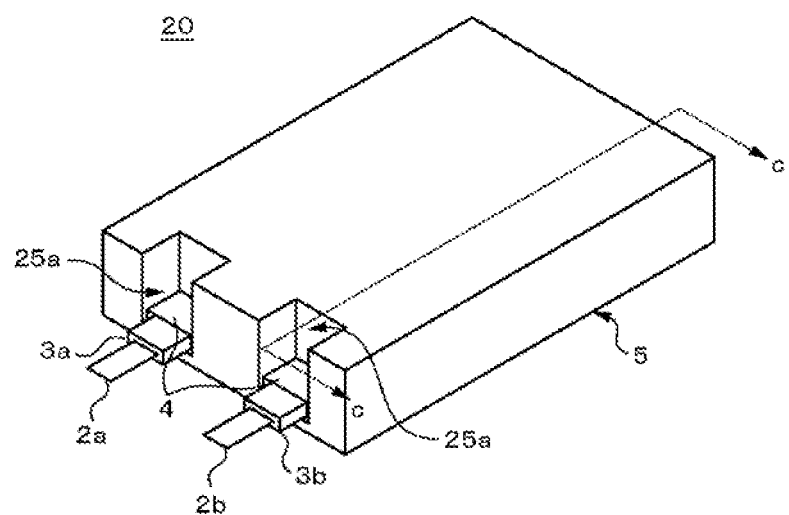
FIG. 12A and 12B are diagrammatic views showing another example of the construction of a non-aqueous electrolyte battery according to an embodiment.
Figure 12B:
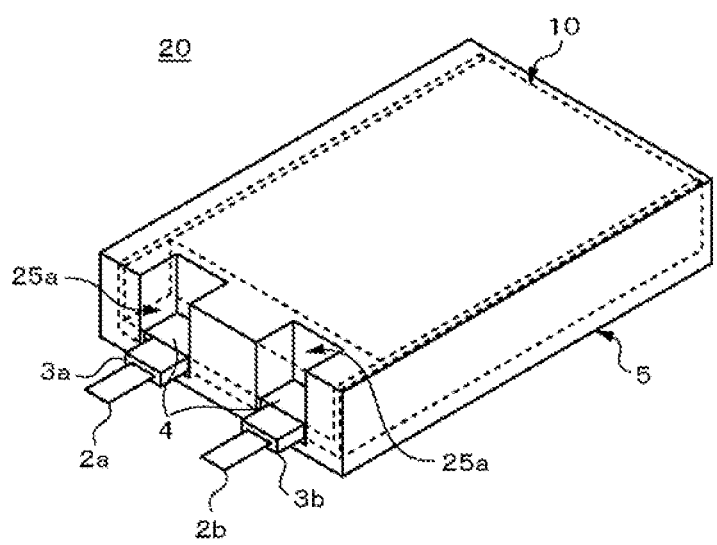

FIG. 12A is a diagrammatic view showing an example of the appearance of a secondary battery 20 according to the second embodiment, and FIG. 12B is a diagrammatic view showing an example of the construction of the secondary battery 20. The secondary battery 20 includes a resin protective layer 5 for improving the battery strength, and further has an opening forming portion 25a such that a sealing portion of the laminated film 4 is opened when the battery internal pressure rises. By virtue of the opening forming portion 25a, even when gas is generated in the battery to increase the battery internal pressure, the internal pressure can be quickly lowered.

The secondary battery 20 is described below in detail. The materials for and constructions of the battery element 10 and the laminated film 4 covering the battery element 10 are the same as those in the first embodiment, and therefore descriptions of them are omitted.

Resin Protective Layer

The resin protective layer 5 is formed around the laminated film 4 containing therein the battery element 10, and has formed therein an opening forming portion 25a through which a part of a sealing portion of the laminated film 4 is exposed. With respect to the resin protective layer 5, the ultraviolet curing resin or thermosetting resin used in the first embodiment is used, and therefore detailed descriptions of them are omitted. As in the case of the first embodiment, a fiber material is optionally used to improve the resin protective layer 5 in strength.

The resin protective layer 5 is formed so as to cover almost all the sealing portion of the laminated film 4. When the resin protective layer 5 is formed to improve the battery strength, a portion on which the resin protective layer 5 is formed achieves a pressure resistance larger than the pressure resistance obtained by sealing the laminated film 4. On the other hand, a part of the sealing portion of the laminated film 4 is exposed through the opening forming portion 25a, and this part of the sealing portion maintains the pressure resistance obtained by sealing the laminated film 4. Accordingly, the exposed portion of the sealing portion has a pressure resistance lower than the pressure resistance of another sealing portion, so that this sealing portion having a lower pressure resistance enables the lowering of the battery internal pressure when the internal pressure rises. Either a single opening or a plurality of openings may be formed.

The opening forming portion 25a can be formed in any portion opposite to the side portion of the battery element 10 as long as the sealing portion of the laminated film 4 is exposed. In an embodiment, as shown in diagrammatic views in FIGS. 12A and 12B and a cross-section in FIG. 13, taken along the line c-c in FIG. 12A, the opening forming portion 25a is formed in a lead portion for each of the positive electrode terminal 2a and the negative electrode terminal 2b. In the lead portions for the positive electrode terminal 2a and the negative electrode terminal 2b, the positive electrode terminal 2a and the negative electrode terminal 2b and the laminated film 4 are sealed together through, respectively, the adhesive films 3a and 3b, and thus each lead portion is the boundary between the resin material and the metal material and hence basically has a low pressure resistance, as compared to another sealing portion in which the inner resin layers 4d of the laminated film 4 are sealed together. As a result, when the battery internal pressure rises, the internal pressure can be more quickly lowered, thereby providing satisfactory safety.

In this case, the opening forming portion 25a may be formed in either each of or any one of the lead portions for the positive electrode terminal 2a and the negative electrode terminal 2b. Alternatively, the opening forming portion 25a may be formed in the lead portion for the positive electrode terminal 2a and/or negative electrode terminal 2b and in a portion other than the lead portions.

The forms of the adhesive film 3a disposed between the positive electrode terminal 2a and the inner resin layer 4d and the adhesive film 3b disposed between the negative electrode terminal 2b and the inner resin layer 4d can be changed to make a difference in pressure resistance between the lead portion for the positive electrode terminal 2a and the lead portion for the negative electrode terminal 2b. Specifically, as shown in a cross-sectional view of the lead portion for electrode terminal after sealing the laminated film 4 in FIG. 14A and in a top view of the lead portion for electrode terminal in FIG. 14B, adhesive films 3a and 3b having, for example, the same width and different lengths in the top portion-bottom portion direction are used. As shown in FIG. 14B, the positive electrode terminal 2a and the negative electrode terminal 2b have the same width, and the length of the adhesive film 3b is a half of the length of the adhesive film 3a. Accordingly, the area of the adhesive film 3b in contact with the negative electrode terminal 2b is a half of the area of the adhesive film 3a in contact with the positive electrode terminal 2a.

The adhesive films 3a and 3b are members for improving the adhesive properties of the positive electrode terminal 2a and the negative electrode terminal 2b with the inner resin layer 4d. Accordingly, for example, by employing the construction shown in FIGS. 14A and 14B, the pressure resistance of the lead portion for the negative electrode terminal 2b can be lower than the pressure resistance of the lead portion for the positive electrode terminal 2a.

(2-2) Method for Producing a Non-Aqueous Electrolyte Battery

The secondary battery according to the second embodiment is produced by the same method as the method in the first embodiment except that, for example, a protrusion having a shape corresponding to the opening forming portion 25a is formed in a portion of the mold for forming the opening forming portion 25a.

The secondary battery 1 thus produced in the first embodiment and secondary battery 20 in the second embodiment individually have the resin protective layer 5 formed on the outer surface of the laminated film 4 as a casing member material, thereby achieving high battery strength, In the secondary battery 1 and the secondary battery 20, the battery element 10 covered with the laminated film 4 is placed in a mold, and the mold is filled with a resin material to form the resin protective layer 5. Accordingly, the resultant secondary battery has a constant outside dimension, and further a useless space is not formed between the resin protective layer 5 and the laminated film 4, and thus the secondary battery produced has high volumetric efficiency. Upon covering the battery element 10 with the laminated film 4, very small voids are caused in the folded portion of the laminated film 4 and the like. When the resin protective layer 5 is formed by the method described above, the resin material goes into the voids, further improving the battery strength.

In the secondary battery 20, by virtue of the opening forming portion 25a, when the battery internal pressure rises, the sealing portion of the laminated film 4 exposed through the opening forming portion 25a enables the lowering of the pressure, thereby providing satisfactory safety.

A battery element having a flat, spirally wound electrode structure, which is formed by stacking on one another a strip positive electrode, a strip negative electrode, and a separator disposed between the positive and negative electrodes and spirally winding them together, has high strength in the side portion of the spirally wound battery element due to its spirally wound structure. On the other hand, a battery element having a stacked electrode structure has a side portion corresponding to the electrode stacked side, and hence has low strength in the side portion such that the end of each electrode is easily bent. For this reason, the construction in the present embodiment in which the battery strength is improved by forming the resin protective layer 5 achieves remarkable effect especially when the battery element having a stacked electrode structure is used.

EXAMPLES

Hereinbelow, embodiments will be described in more detail with reference to the following Examples, which should not be construed as limiting the scope of the present application.

Example 1

Sample 1-1
Preparation of Positive Electrode

90 Parts by mass of lithium cobaltate ($LiCoO_2$) as a cathode active material, 5 parts by mass of acetylene black as a conductor, and 5 parts by mass of polyvinylidene fluoride (PVdF) as a binder were uniformly mixed with each other to prepare a positive electrode composition, and the anode mixture prepared was dispersed in N-methyl-2-pyrrolidone to form an anode mixture slurry. The resultant anode mixture slurry was uniformly applied to both sides of an aluminum (Al) foil as a negative electrode current collector, and subjected to vacuum drying at 100° C. for 24 hours, followed by pressure molding by means of a roll pressing machine, to form a cathode active material layer. Subsequently, a positive electrode terminal made of aluminum (Al) was connected to a portion of the positive electrode current collector at one end on which the cathode active material layer was not formed.

Preparation of Negative Electrode

90 Parts by mass of graphite as an anode active material and 10 parts by mass of polyvinylidene fluoride (PVdF) as a binder were uniformly mixed with each other to prepare an anode mixture, and the anode mixture prepared was dispersed in N-methyl-2-pyrrolidone to form an anode mixture slurry. Then, the resultant anode mixture slurry was uniformly applied to both sides of a copper (Cu) foil as a negative electrode current collector, and subjected to vacuum drying at 120° C. for 24 hours, followed by pressure molding by means of a roll pressing machine, to form an anode active material layer. Subsequently, a negative electrode terminal made of nickel (Ni) was connected to a portion of the negative electrode current collector at one end on which the anode active material layer was not formed.

Preparation of Secondary Battery

Lithium hexafluorophosphate ($LiPF_6$) was first dissolved in a mixed solvent, which was obtained by mixing together ethylene carbonate (EC) and propylene carbonate (PC) in a 6:4 mass ratio, so that the concentration became 0.6 mol/l to prepare a non-aqueous electrolytic solution. Then, using a matrix polymer composed of a block copolymer including vinylidene fluoride (VdF) and hexafluoropropylene (HFP) in a 93:7 mass ratio, and using a diluent solvent composed of dimethyl carbonate (DMC), the matrix polymer, the non-aqueous electrolytic solution, and the diluent solvent were mixed in a 1:10:10 mass ratio and dissolved at 70° C. to obtain a sol electrolyte.

Then, the above-obtained sol electrolyte was applied to both sides of each of the positive electrode and the negative electrode, and the diluent solvent was removed by volatilization using warm air at 100° C. to form a gel electrolyte layer on the surfaces of each of the positive electrode and the negative electrode. Subsequently, between the positive electrode and the negative electrode each having a gel electrolyte layer formed thereon was disposed a separator composed of a porous biaxially oriented film made of polyethylene (PE), and they were stacked on one another and spirally wound together to prepare a battery element. Finally, the resultant battery element was covered with a casing member material composed of an aluminum laminated film, and the casing member material was sealed by bonding the material around the battery element by heat sealing to prepare a spirally wound-type secondary battery. In this instance, the respective regions of the positive electrode terminal and negative electrode terminal opposite to the aluminum laminated film were individually covered with an adhesive film composed of acid-modified polypropylene having the same form, and the positive electrode terminal and the negative electrode terminal were electrically extended from the sealing portion of the laminated film through the adhesive film.

Sample 1-2

A spirally wound-type secondary battery prepared in the same manner as in sample 1-1 was placed in a mold, and a space in the mold was filled with polyurethane acrylate which is an ultraviolet curing resin, and then the polyurethane acrylate was cured using an ultraviolet lamp having a wave length $\lambda$ of 365 nm. Each side of the spirally wound-type secondary battery was irradiated with the ultraviolet lamp for 5 minutes, thus preparing a spirally wound-type secondary battery having a resin protective layer having a thickness of 1.0 mm around the laminated film covering the battery element. The thickness of the resin protective layer was controlled by appropriately selecting a space formed between the mold and the spirally wound-type secondary battery.

Sample 1-3

A spirally wound-type secondary battery having a resin protective layer formed as the outermost layer was prepared in the same manner as in sample 1-2, except that a woven fabric (#100; thickness: 0.10 mm) composed of glass fiber was wound around the spirally wound-type secondary battery.

Sample 1-4

A spirally wound-type secondary battery having a resin protective layer formed as the outermost layer was prepared in the same manner as in sample 1-2, except that continuous fiber composed of glass fiber was wound around the spirally wound-type secondary battery. The glass fiber was wound, as shown in FIG. 15, uniformly in the top portion-bottom portion direction of the spirally wound-type secondary battery.

Sample 1-5

A spirally wound-type secondary battery having a resin protective layer formed as the outermost layer was prepared in the same manner as in sample 1-2, except that the space in the mold was filled with an epoxy resin which is a thermosetting resin and then the epoxy resin was cured by a heat treatment in an environment at 60° C. for one hour.

Sample 1-6

A spirally wound-type secondary battery having a resin protective layer formed as the outermost layer was prepared in the same manner as in sample 1-2, except that a woven fabric (#200; thickness: 0.25 mm) composed of carbon fiber was wound around the spirally wound-type secondary battery, and that the space in the mold was filled with an epoxy resin and then the epoxy resin was cured by a heat treatment in an environment at 60° C. for one hour.

Sample 1-7

A spirally wound-type secondary battery having a resin protective layer formed as the outermost layer was prepared in the same manner as in sample 1-2, except that an opening through which the sealing portion of the laminated film was exposed was formed in around each of the positive electrode terminal lead portion and the negative electrode terminal lead portion.

Sample 1-8

A spirally wound-type secondary battery having a resin protective layer formed as the outermost layer was prepared in the same manner as in sample 1-2, except that a woven fabric (#100; thickness: 0.10 mm) composed of glass fiber was wound around the spirally wound-type secondary battery, and that an opening through which the sealing portion of the laminated film was exposed was formed in around each of the positive electrode terminal lead portion and the negative electrode terminal lead portion.

Sample 1-9

Preparation of Positive Electrode

90 Parts by mass of lithium cobaltate ($LiCoO_2$) as a cathode active material, 5 parts by mass of acetylene black as a conductor, and 5 parts by mass of polyvinylidene fluoride (PVdF) as a binder were uniformly mixed to prepare a cathode mixture, and the cathode mixture prepared was dispersed in N-methyl-2-pyrrolidone to form a cathode mixture slurry. The resultant cathode mixture slurry was uniformly applied to both sides of an aluminum (Al) foil as a positive electrode current collector, and subjected to vacuum drying at 100° C. for 24 hours, followed by pressure molding by means of a roll pressing machine, to form a cathode active material layer. Subsequently, a positive electrode terminal made of aluminum (Al) was connected to a portion of the positive electrode current collector at one end on which the cathode active material layer was not formed. The positive electrode current collector was in a form such that the positive electrode terminal was continuously electrically extended from one side of the rectangular principal surface of the current collector.

Preparation of Negative Electrode

90 Parts by mass of graphite as an anode active material and 10 parts by mass of polyvinylidene fluoride (PVdF) as a binder were uniformly mixed to prepare an anode mixture, and the anode mixture prepared was dispersed in N-methyl-2-pyrrolidone to form an anode mixture slurry. Then, the resultant anode mixture slurry was uniformly applied to both sides of a copper (Cu) foil as a negative electrode current collector, and subjected to vacuum drying at 120° C. for 24 hours, followed by pressure molding by means of a roll pressing machine, to form an anode active material layer. Subsequently, a negative electrode terminal made of nickel (Ni) was connected to a portion of the positive electrode current collector at one end on which the anode active material layer was not formed. The positive electrode current collector was in a form such that the negative electrode terminal was continuously electrically extended from one side of the rectangular principal surface of the current collector. The principal surface of the negative electrode had an outside dimension larger by 2 mm than that of the principal surface of the positive electrode.

Preparation of Secondary Battery

15 Pieces of the above-obtained positive electrodes, 16 pieces of the above-obtained negative electrodes, and 30 pieces of separators composed of a porous biaxially oriented film made of polyethylene (PE), which were individually cut into an outside dimension slightly larger than that of the positive electrode and the negative electrode, were prepared and stacked on one another in the order of negative electrode, separator, positive electrode, separator, negative electrode, . . . , separator, and negative electrode. They were fixed in a state such that the positive electrode and negative electrode had the separator disposed therebetween and they closely adhered to one another. Then, 15 pieces of positive electrode current collectors electrically extended from the positive electrode were connected by ultrasonic welding to a current collector lead made of aluminum (Al) as a separate part. Similarly, 16 pieces of negative electrode current collectors electrically extended from the negative electrode were connected by ultrasonic welding to a current collector lead made of nickel (Ni) as a separate part, thus preparing a battery element having a stacked structure.

Next, the above-prepared battery element having a stacked structure was impregnated with a non-aqueous electrolytic solution prepared by dissolving lithium hexafluorophosphate ($LiPF_6$) in a mixed solvent of ethylene carbonate (EC) and propylene carbonate (PC) in a 1:1 volume ratio so that the concentration became 1.0 mol/l. Finally, the resultant battery element was covered with a casing member material composed of an aluminum laminated film, and the casing member material was sealed by bonding the material around the battery element by heat sealing to prepare a stacked-type secondary battery.

Sample 1-10

A stacked-type secondary battery prepared in the same manner as in sample 1-9 was placed in a mold, and a space in the mold was filled with polyurethane acrylate which is an ultraviolet curing resin, and then the polyurethane acrylate was cured using an ultraviolet lamp having a wave length λ of 365 nm. Each side of the secondary battery was irradiated with the ultraviolet lamp for 5 minutes, thus preparing a stacked-type secondary battery having a resin protective layer having a thickness of 1.0 mm around the laminated film covering the battery element. The thickness of the resin protective layer was controlled by appropriately selecting a space formed between the mold and the stacked-type secondary battery.

Sample 1-11

A stacked-type secondary battery having a resin protective layer formed as the outermost layer was prepared in the same manner as in sample 1-10, except that a woven fabric (#100; thickness: 0.10 mm) composed of glass fiber was wound around the stacked-type secondary battery.

Sample 1-12

A stacked-type secondary battery having a resin protective layer formed as the outermost layer was prepared in the same manner as in sample 1-10, except that an opening through which the sealing portion of the laminated film was exposed was formed in around each of the positive electrode terminal lead portion and the negative electrode terminal lead portion.

Sample 1-13

A stacked-type secondary battery having a resin protective layer formed as the outermost layer was prepared in the same manner as in sample 1-10, except that a woven fabric (#200; thickness: 0.25 mm) composed of carbon fiber was wound around the stacked-type secondary battery, and that an opening through which the sealing portion of the laminated film was exposed was formed in around each of the positive electrode terminal lead portion and the negative electrode terminal lead portion.

Drop Test

The samples of secondary batteries thus prepared were individually dropped so that the bottom portion of the battery faced the ground as shown in FIG. 16A. In this test, a drop distance was 10 m and each sample was dropped five times, and, after the drop test, the resultant sample was observed in respect of breakage of the laminated film casing member, removal of the resin protective layer, and deformation of the battery. The samples of secondary batteries were individually evaluated collectively with respect to the results of the above observation, and ranked in the evaluation rankings shown below.

With respect to the deformation of the battery, as shown in FIG. 16B, a deforming angle of the deformed portion of the battery was measured, and a sample having a deforming angle of less than 15° was rated "Slight", a sample having a deforming angle of 15 to less than 30° was rated "Small", a sample having a deforming angle of 30 to less than 60° was rated "Medium", and a sample having a deforming angle of 60° or more was rated "Large". The evaluation rankings are "A", "B", "C", and "D" in descending order. With respect to the breakage of the casing member material, a sample in which the aluminum laminated film suffered breakage was rated "×", and a sample in which the aluminum laminated film suffered no breakage was rated "○". With respect to the removal of the resin protective layer, a sample in which the resin protective layer was removed was rated "×", and a sample in which the resin protective layer was not removed was rated "○".

FIGS. 16A and 16B show an example of the test using the sample 1-1.

The results of evaluations are shown in the Table 1 below.

In contrast, with respect to the samples 1-2 to 1-8 and 1-10 to 1-13 having a resin protective layer formed using an ultraviolet curing resin or a thermosetting resin, it has been found that the laminated film suffered no breakage and the battery safety was improved, irrespective of the structure of the battery element or whether an opening is formed. Further, it has been found that deformation of the battery is more surely prevented especially when the stacked-type battery element is used.

With respect to the samples 1-3, 1-4, 1-6, 1-8, 1-11, and 1-13 having a fiber material in the resin protective layer, the protective layer was not removed and deformation of the battery was slight. The sample 1-4, in which glass fiber as a fiber material was wound in the same direction as the drop direction of the secondary battery, and the samples 1-3, 1-6, 1-8, 1-11, and 1-13, in which a woven fabric was wound as a fiber material, individually achieved high battery strength. Especially the sample 1-4, in which glass fiber was wound in substantially the same direction as the drop direction of the secondary battery, suffered almost no deformation and achieved very high strength.

From the above results, it has been found that, when the battery element is covered with a laminated film and further a resin protective layer having, for example, a fiber material therein is formed on the laminated film, the battery can be improved in both safety and strength.

Example 2

Sample 2-1

A spirally wound-type secondary battery covered with a laminated film was prepared in the same manner as in sample 1-1.

TABLE 1

| | Type of battery element | Resin protective layer | Fiber material | | Opening | Breakage of casing member | Removal of protective layer | Deformation of battery | Evaluation |
|---|---|---|---|---|---|---|---|---|---|
| | | | Material | Form | | | | | |
| Sample 1-1 | Spirally wound | — | — | — | — | × | — | Medium | C |
| Sample 1-2 | Spirally wound | Polyurethane acrylate | × | — | × | ○ | × | Medium | B |
| Sample 1-3 | Spirally wound | Polyurethane acrylate | Glass fiber | Woven fabric | × | ○ | ○ | Small | A |
| Sample 1-4 | Spirally wound | Polyurethane acrylate | Glass fiber | Wound in predetermined direction | × | ○ | ○ | Slight | A+ |
| Sample 1-5 | Spirally wound | Epoxy resin | × | — | × | ○ | × | Medium | B |
| Sample 1-6 | Spirally wound | Epoxy resin | Carbon fiber | Woven fabric | × | ○ | ○ | Small | A |
| Sample 1-7 | Spirally wound | Polyurethane acrylate | × | — | ○ | ○ | × | Medium | B |
| Sample 1-8 | Spirally wound | Polyurethane acrylate | Glass fiber | Woven fabric | ○ | ○ | ○ | Small | A |
| Sample 1-9 | Stacked | — | — | — | — | × | — | Large | D |
| Sample 1-10 | Stacked | Polyurethane acrylate | × | — | × | ○ | × | Medium | B |
| Sample 1-11 | Stacked | Polyurethane acrylate | Glass fiber | Woven fabric | × | ○ | ○ | Small | A |
| Sample 1-12 | Stacked | Epoxy resin | × | — | ○ | ○ | × | Medium | C |
| Sample 1-13 | Stacked | Epoxy resin | Carbon fiber | Woven fabric | ○ | ○ | ○ | Small | A |

As can be seen from the Table 1, with respect to each of the sample 1-1 and sample 1-9 of known secondary batteries having a battery element covered with a laminated film, in the drop test, the sealing portion of the laminated film suffered breakage, and further the battery deformed. Particularly, it has been found that the sample 1-9 of secondary battery using the battery element having a stacked electrode structure, in which the end of electrode is exposed through the side of the battery element, has larger deformation of the battery and hence has lower strength than that of the sample 1-1 using the battery element having a spirally wound structure.

Sample 2-2

A spirally wound-type secondary battery having a resin protective layer formed as the outermost layer was prepared in the same manner as in sample 2-1, except that a resin protective layer composed of polyurethane acrylate was formed, and that an opening through which the sealing portion of the laminated film was exposed was formed in around each of the positive electrode terminal lead portion and the negative electrode terminal lead portion.

Sample 2-3

Figure 14A:
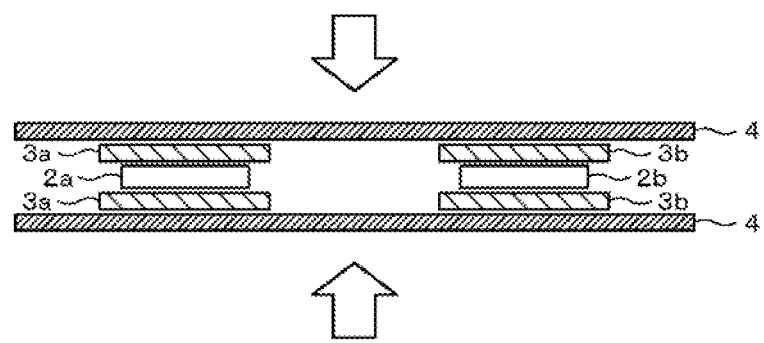
FIG. 14A and 14B are diagrammatic views showing another example of the construction of a non-aqueous electrolyte battery according to an embodiment.
Figure 14B:
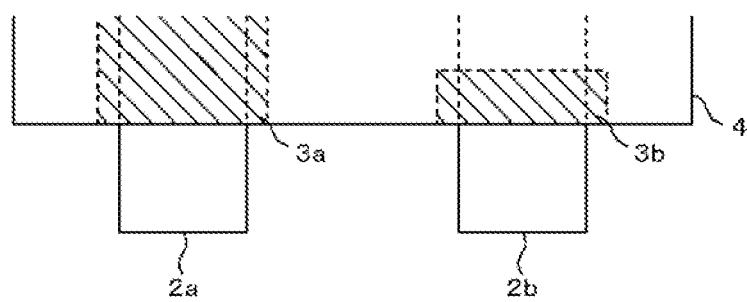

A stacked-type secondary battery was prepared in the same manner as in sample 1-9, except that, as shown in a top view in FIG. 14A and a cross-sectional view in FIG. 14B, the length of a adhesive film used for the negative electrode terminal was a half of the length of an adhesive film used for the positive electrode terminal and the area of the adhesive film in contact with the negative electrode terminal was 50% of the area of the adhesive film in contact with the positive electrode terminal. A woven fabric (#100; thickness: 0.10 mm) composed of glass fiber was wound around the resultant stacked-type secondary battery, and then an opening through which the sealing portion of the laminated film was exposed was formed in around each of the positive electrode terminal lead portion and the negative electrode terminal lead portion to prepare a stacked-type secondary battery having a resin protective layer composed of polyurethane acrylate formed as the outermost layer.

Sample 2-4

A stacked-type secondary battery was prepared in the same manner as in sample 1-9, and a woven fabric (#200; thickness: 0.25 mm) composed of carbon fiber was wound around the stacked-type secondary battery, and then a resin protective layer composed of polyurethane acrylate was formed, thus preparing a stacked-type secondary battery.

Overcharge Test

With respect to each of the samples of secondary batteries thus prepared, an overcharge test was performed at the upper limit voltage of 10 V by constant current charging at 3 A from the discharged state. The highest temperature in the overcharge test and a battery total thickness after the overcharge test were measured, and, using the battery total thickness, a battery expansion ratio was determined by making a calculation from the formula: (Battery total thickness after overcharge test)/(Battery total thickness before overcharge test)× 100. A temperature on the surface of the battery was used as a battery temperature.

The results of evaluations are shown in the Table 2 below.

lowered in the sample 2-2. In this instance, the temperature on the battery surface was 70° C. A battery expansion ratio after the test was 130%.

In the samples 2-2 and 2-3, the laminated film is improved in sealing properties at a portion on which the resin protective layer is formed. Further, in the samples 2-2 and 2-3, by virtue of the openings formed in the lead portions for the positive electrode terminal and the negative electrode terminal, when the pressure in the battery rises, the electrode lead portion having a relatively small sealing force is opened, thereby lowering the internal pressure. Therefore, the battery temperature was as low as 70 to 80° C. when the internal pressure was lowered, and the battery expansion ratio was 130 to 140% and thus large expansion of the battery did not occur.

Especially in the sample 2-3, with respect to the lead portion for the negative electrode terminal, a contact area between the adhesive film having good bonding properties with a metal material and the negative electrode terminal was reduced, and hence a contact area between the inner resin layer of the laminated film having poorer adhesive properties with a metal material than those of the adhesive film and the negative electrode terminal was increased. Accordingly, in the sample 2-3, collectively the sealing properties of the lead portion for the negative electrode terminal were lower than the sealing properties of the lead portion for the positive electrode terminal, and thus the internal pressure was likely to be lowered from a portion around the lead portion for the negative electrode terminal, achieving higher safety.

In contrast, in the sample 2-1, the battery was completely charged and then the battery gradually expanded and remained in an expanded state for a while, and then the sealing portion in one side portion of the battery was opened. In this instance, the temperature on the battery surface was 120° C. A battery expansion ratio after the test was 210%.

In the sample 2-4, immediately after expansion of the battery was observed, the sealing portions in both side portions of the battery were opened. In this instance, the temperature on the battery surface was 135° C. A battery expansion ratio after the test was 240%.

TABLE 2

| | Type of battery element | Resing protective layer | Fiber material | Opening | Area ratio of adhesive film for negative electrode (%) | Battery temperature (° C.) | Battery expansion ratio (%) |
|---|---|---|---|---|---|---|---|
| Sample 2-1 | Spirally wound | — | — | — | 100 | 120 | 210 |
| Sample 2-2 | Spirally wound | Polyurethane acrylate | X | ○ | 100 | 80 | 140 |
| Sample 2-3 | Stacked | Polyurethane acrylate | Glass fiber | ○ | 50 | 70 | 130 |
| Sample 2-4 | Stacked | Polyurethane acrylate | Carbon fiber | X | 100 | 135 | 240 |

In the sample 2-2, the battery was completely charged during the overcharge test and expansion of the battery was observed, but, immediately after this, a portion around the lead portion for the negative electrode terminal in the battery top portion was opened, thereby lowering the internal pressure. In this instance, the temperature on the battery surface was 80° C. A battery expansion ratio after the test was 140%.

The sample 2-3 exhibited substantially the same behavior as that of the sample 2-2 such that, immediately after expansion of the battery was observed, only a portion around the lead portion for the negative electrode terminal was opened, thereby lowering the internal pressure. A period of time until the internal pressure was lowered in the sample 2-3 was shorter than a period of time until the internal pressure was In the sample 2-1, a resin protective layer was not formed, and therefore the battery gradually expanded and remained in an expanded state for a while. For this reason, the internal pressure was difficult to lower, thereby increasing the battery temperature and the battery expansion ratio.

In the sample 2-4, a resin protective layer was formed, but an opening was not formed, and therefore all the sealing portions of the laminated film had enhanced sealing properties. For this reason, the internal pressure was difficult to lower, thereby increasing the battery temperature and the battery expansion ratio.

From the above results, it has been found that, when the battery element is covered with a laminated film and a resin protective layer is formed on the laminated film and an opening is formed to expose the sealing portion of the laminated film, the battery can achieve a high safety.

Hereinabove, the first and second embodiments are described in detail, but the present application is not limited to the above embodiments, and can be changed or modified based on the technical concept of the present application.

For example, the secondary battery using a battery element having a stacked structure is described in the above embodiments, but the battery element is not limited to this, and a battery element of any type, such as a spirally wound-type or zigzag folded-type battery element, can be used as long as the battery element can be contained in a thin battery using a laminated film casing member.

The battery element can be used not only in a secondary battery but also in a thin primary battery covered with a laminated film.

In the present application, a non-aqueous electrolyte battery having an improved battery strength and a high safety is achieved. Further, a non-aqueous electrolyte battery having a high volumetric efficiency can be produced.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolyte battery comprising:
    a battery element including a positive electrode, a negative electrode, and a separator disposed between the positive electrode and the negative electrode;
    a film-form casing member for containing the battery element and an electrolyte in an enclosed space, the film-form casing member having a first surface facing the battery element and a second surface opposite the first surface; and
    a single protective layer comprising a resin material formed on the second surface of the film-form casing member,
    wherein the protective layer is formed around the film-form casing member.

2. The non-aqueous electrolyte battery according to claim 1, wherein a fiber material is contained within the single protective layer.

3. The non-aqueous electrolyte battery according to claim 2, wherein the fiber material is provided so that the fiber material is wound around the film-form casing member containing the battery element therein.

4. The non-aqueous electrolyte battery according to claim 3, wherein the fiber material is a continuous fiber.

5. The non-aqueous electrolyte battery according to claim 4, wherein the fiber material is a woven fabric formed by weaving the continuous fiber.

6. The non-aqueous electrolyte battery according to claim 3, wherein the fiber material is a non-woven fabric formed from a short fiber.

7. The non-aqueous electrolyte battery according to claim 2, wherein the fiber material is at least one member selected from the group consisting of a glass fiber, a carbon fiber, and an aramid fiber.

8. The non-aqueous electrolyte battery according to claim 1, wherein the resin material is a photosetting resin or a thermosetting resin.

9. The non-aqueous electrolyte battery according to claim 1, wherein the battery element has a stacked electrode structure in which a plurality of the negative and positive electrodes are stacked alternately and isolated by separators.

10. A non-aqueous electrolyte battery comprising:
    a battery element including a positive electrode, a negative electrode, and a separator, the positive and negative electrodes being stacked and isolated by the separator;
    a film-form casing member for containing the battery element and an electrolyte in an enclosed space, the film-form casing member having a first surface facing the battery element and a second surface opposite the first surface; and
    a single protective layer comprising a resin material formed on the second surface of the film-form casing member,
    wherein the protective layer has an opening through which a part of a sealing portion of the film-form casing member is exposed, and
    wherein the protective layer is formed around the film-form casing member.

11. The non-aqueous electrolyte battery according to claim 10, wherein the sealing portion of the film-form casing member exposed through the opening has a pressure resistance lower than that of another sealing portion.

12. The non-aqueous electrolyte battery according to claim 11, wherein the opening is formed in a portion facing at least one of a first lead portion through which a positive electrode terminal electrically connected to the positive electrode is electrically extended from the sealing portion of the film-form casing member and a second lead portion through which a negative electrode terminal electrically connected to the negative electrode is electrically extended from the sealing portion of the film-form casing member.

13. The non-aqueous electrolyte battery according to claim 11, further comprising:
    a first resin film formed between the film-form casing member and the positive electrode terminal; and
    a second resin film formed between the film-form casing member and the negative electrode terminal,
    wherein the first resin film and the second resin film are formed so that a first contact area between the positive electrode terminal and the first resin film and a second contact area between the negative electrode terminal and the second resin film are different from each other.

14. The non-aqueous electrolyte battery according to claim 10, wherein a fiber material is contained within the single protective layer.

* * * * *